Dec. 25, 1951  J. A. UPPER  2,579,885
POURING ARC FURNACE
Filed Dec. 4, 1948  4 Sheets-Sheet 1
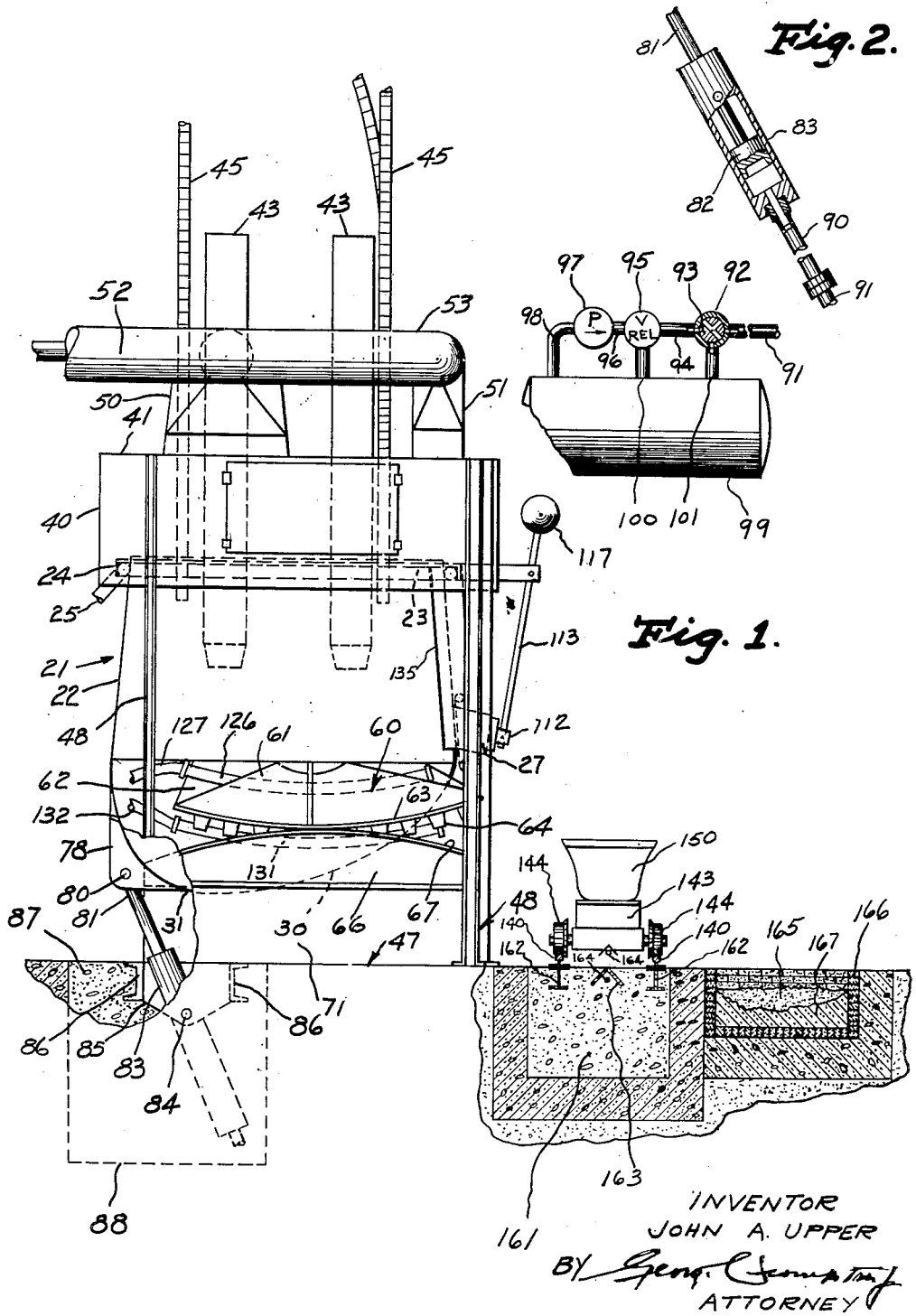
INVENTOR
JOHN A. UPPER
BY
ATTORNEY

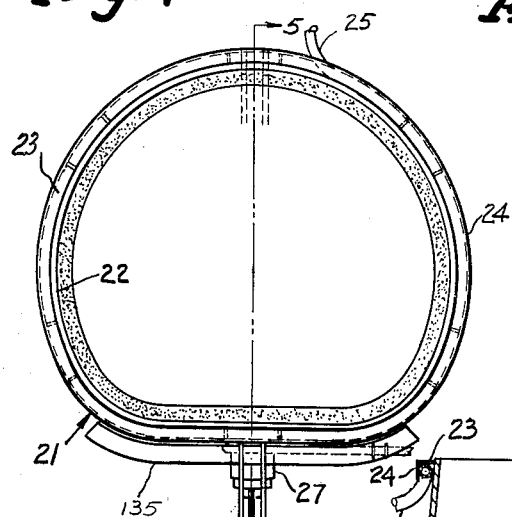
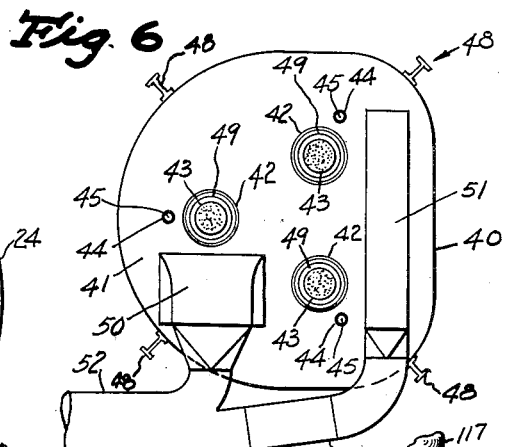
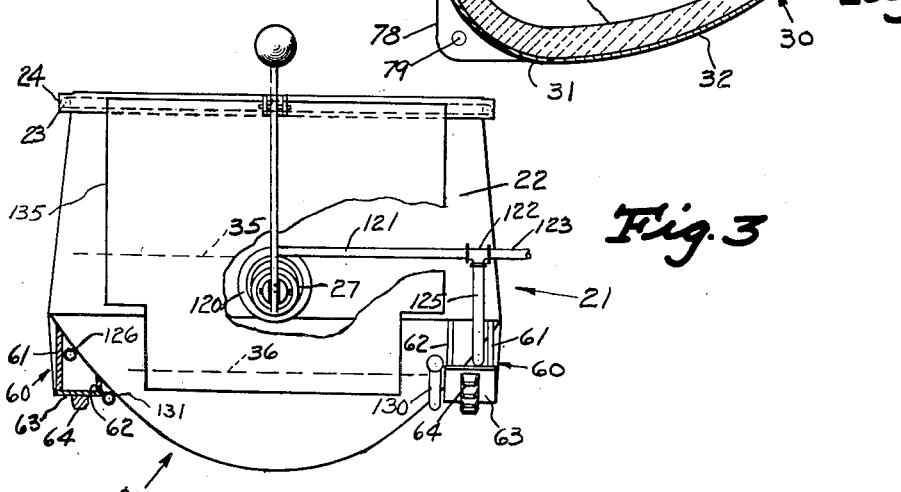
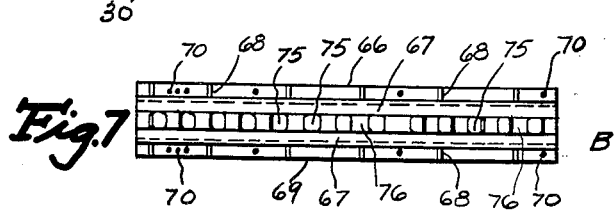

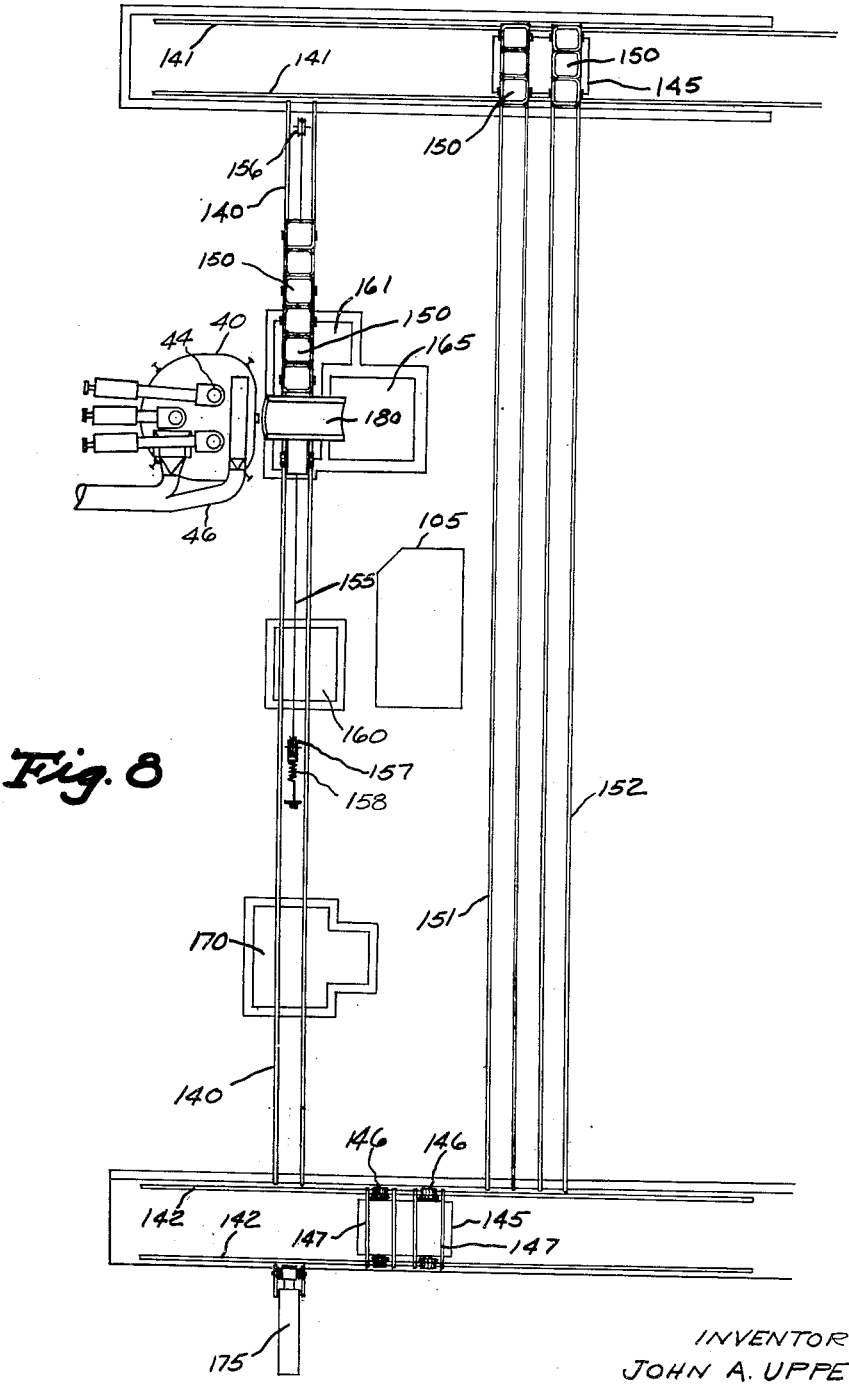

Dec. 25, 1951    J. A. UPPER    2,579,885
POURING ARC FURNACE
Filed Dec. 4, 1948    4 Sheets-Sheet 4
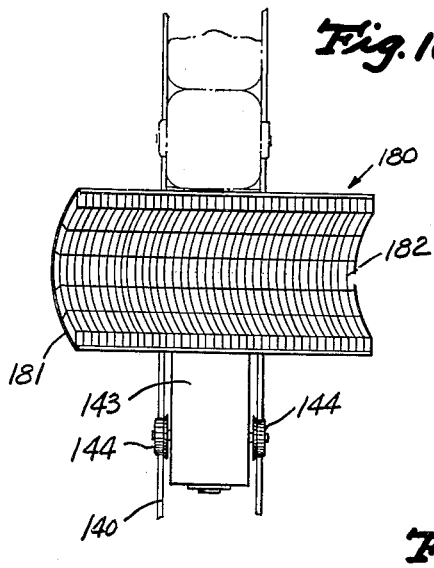
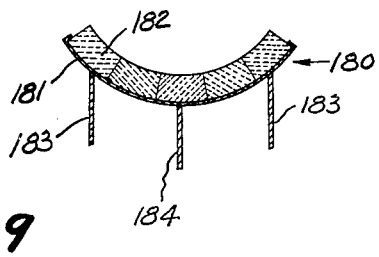
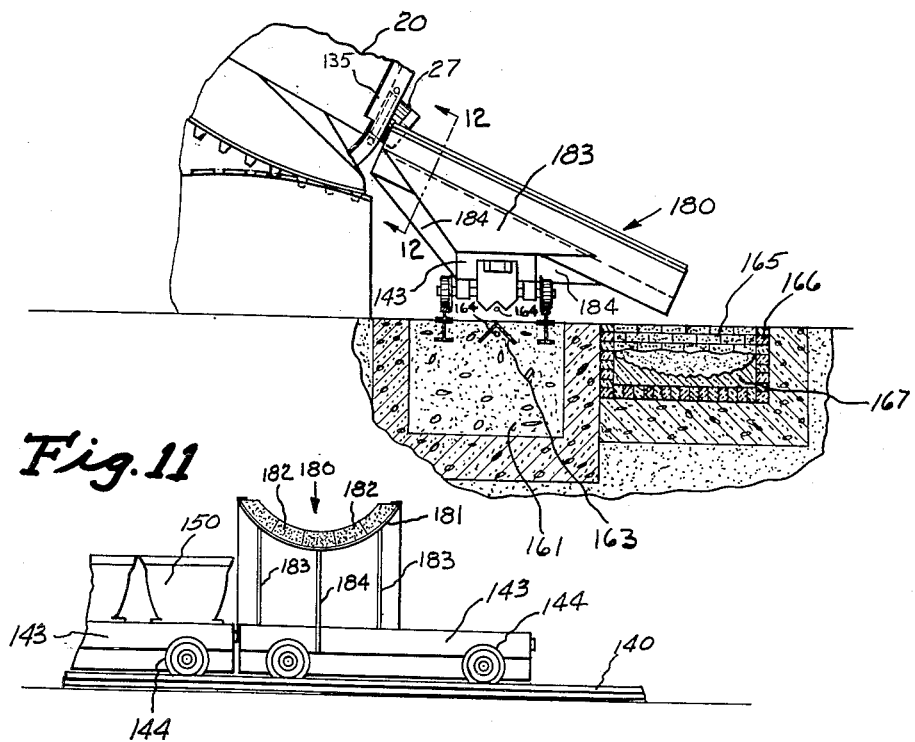
INVENTOR
JOHN A UPPER
BY George Crompton Jr
ATTORNEY Patented Dec. 25, 1951

2,579,885

UNITED STATES PATENT OFFICE 2,579,885

POURING ARC FURNACE

John A. Upper, Niagara Falls, Ontario, Canada, assignor to Norton Company, Worcester, Mass., a corporation of Massachusetts Application December 4, 1948, Serial No. 63,604

6 Claims. (Cl. 13—10)

The invention relates to the production of ingots of crystalline alumina from a fusion of ore such as bauxite ore and the invention involves an improved tiltable electric arc pouring furnace from which the fusion is poured into ingot molds and the invention further involves an improved furnacing method for the production of ingots of desired chemical composition and physical characteristics.

One object of the invention is to provide a tiltable furnace for casting ingots of so-called regular alumina, which is crystalline alpha alumina of dense structure having a purity generally 94% $Al_2O_3$ or better and usually not above 98% $Al_2O_3$. Another object of the invention is to produce ingots of regular alumina having a coarse dense waxy crystal development. Another object of the invention is to produce by the casting method regular alumina which is not inferior to the product long made in the conventional electric arc furnace in the use of which the entire contents of the furnace is solidified in situ after the bauxite ore has been fused. Another object of the invention is to produce by the above indicated pouring and casting method, regular alumina which, when crushed and bonded to make grinding wheels, imparts to such grinding wheels that characteristic blue color which is recognized by the consumers as the hallmark of a superior product.

Another object of the invention is to produce ingots of alumina of any degree of purity or any crystalline structure by the pouring and casting method from natural aluminous ore, either bauxite or otherwise or from any impure material. Another object of the invention is to provide effective apparatus and an effective method for the continuous fusion of bauxite or other aluminous ore. Another object of the invention is to provide an effective apparatus and method for the continuous fusion of bauxite or other aluminous ore and for withdrawing from the fusion the non-aluminous material, especially for getting rid, from time to time, of the ferro-silicon and titania content of the ore. Another object of the invention is to provide a method and apparatus for the production of fused alumina from bauxite or other aluminous ore whereby a valuable ferro-silicon results as a by-product and whereby nearly all of the mass of the ore (minus that which goes off in the form of gaseous products) results in useful and salable material.

Another object of the invention is greatly to speed the production of fused alumina. Another object of the invention is to achieve a more economical production of alumina. Another object of the invention is, in the manufacture of alumina, to achieve a more efficient utilization of power, that is to say to produce a pound of alumina with the expenditure of less electrical energy than heretofore. Another object of the invention is the reduction or even elimination of heavy manual labor in the production of alumina. Another object of the invention is to produce crystalline alumina with less capital investment. Another object of the invention is to make possible the production of crystalline alumina in a cleaner plant. Another object of the invention is to achieve a better control of the quality of crystalline alumina produced from ores. Another object of the invention is, in the manufacture of alumina from bauxite ore or the like, to eliminate the rehandling of by-products such as partially reduced material, sweepings, magnetic tailings and second grade (unsaleable) ferra-silicon. Another object is to convert bauxite ore into crystalline alumina and saleable ferro-silicon, with practically no loss of material except that which passes off into gases (mostly CO).

Another object is to produce, from bauxite ore or other impure aluminous materials, a crystalline alumina which has certain characteristics superior to those produced by the conventional electric arc furnace. Another object is to make abrasive material which, when made into vitrified bonded grinding wheels, produces grinding wheels which are less susceptible to deterioration from wetting than those of similar composition heretofore made.

Other objects will be in part obvious or in part pointed out hereinafter.

In the accompanying drawings illustrating one of many possible embodiments of the mechanical features of this invention, Figure 1 is a side elevation of a tilting furnace constructed in accordance with the invention, showing also a car and an ingot mold, and showing certain pits in section, Figure 2 is a hydraulic diagram showing how the crucible of the furnace is tilted, Figure 3 is a front elevation of the crucible, Figure 4 is a plan view of the crucible, Figure 5 is a sectional view of the crucible taken on the line 5—5 of Figure 4, Figure 6 is a plan view of the hood of the furnace, the parts being shown on a somewhat smaller scale than that of Figures 1, 3, 4 and 5, Figure 7 is a plan view of a stationary rocker support.

Figure 8 is a plan view on a small scale showing the furnace and also an arrangement of tracks and a car transfer mechanism and a casting pit to cast the ferro-silicon and a pour trough mounted on a car to convey the molten ferro-silicon from the furnace to the casting pit.

Figure 9 is a side elevation of the pouring trough and an end view of the car upon which it is mounted showing also part of the casting pit in section and part of the furnace in side elevation.

Figure 10 is a plan view of the pouring trough and the car on which it is mounted.

Figure 11 is an end view of the pouring trough and a side elevation of the car upon which it is mounted.

Figure 12 is a cross sectional view of the pouring trough taken on the line 12—12 of Figure 9.

Referring first to Figures 1, 3, 4 and 5, the crucible of the electric arc furnace comprises a steel shell 21 in the form of a bucket of a shape to be described. This shell 21 may be made out of good steel plate preferably about one inch or more in thickness. It may be made up from sections welded together and the welding of course should be well done to prevent leakage or the opening up of a seam.

The shape of the shell or bucket 21 is the resultant of several considerations; in the first place the upper portion 22 is generally a frusto-cone and this is for the purpose of insuring that all parts of the surface of this upper portion 22 will be covered with a cascade of water from a pipe 23 extending under a ledge 24 all the way around the upper portion 22. This pipe 23 has holes, too small to be shown, all the way around the shell 21 on the underside and close to the shell, and a flexible hose 25 is connected to the pipe 23 and to a source of water in order to keep water cascading over the upper portion 22 at all times when the furnace is receiving power.

Referring now to Figure 4, the upper portion 22 is flattened on the front, that is to say its otherwise circular section is cut by a chordal plane. The reason for the flattening is to bring the tapping spout 27 (see also Figs. 1 and 5) closer to the center of the crucible than it otherwise would be thus to place it in a relatively hot zone so as to lessen or reduce the tendency to freeze the alumina at this point. Some alumina does freeze at this point but forming only a relatively thin shell which can be broken with a ram rod whereas if the pouring spout 27 were farther from the center of the crucible, the shell of frozen alumina would be thicker and very likely impossible to break with a ram rod.

The bottom 30 of the shell 21 has a shape which is the resultant of the following considerations: in the first place it is continuous with the upper portion 22 in order to form a bucket, in the second place it is curved to avoid sharp corners in the metal which might set up strains to cause fracture and also for avoiding corners which might cause the contents to freeze. It has a decided bulge 31 at the rear portion, this bulge being of lesser radius of curvature in the section of Figure 5 than the forward portion 32 of the bottom and this is for the purpose of locating the lowest portion of the bottom 30 well to the rear of the crucible so that only moderate tilting is required to draw off a considerable portion of the molten ferrosilicon which, as the result of the reduction of the silica and the iron oxide in the ore, settles to the bottom of the crucible. By forming a bulge with a curvature of short radius 31 and a forward portion 32 with a gentle curvature a sort of leverage effect is provided whereby more ferro-silicon can be drawn off by tilting to a given angle than could be done if the bottom 30 were symmetrical. This then is the shape of the bottom 30 in the plane of Figure 5 which is a fore and aft section; the shape in any section plane perpendicular to the section plane of Figure 5 may however be symmetrical as is indicated by the elevational view, Figure 3, that is to say the curvature on the bottom in any such cross section may preferably be the same on each side. However, considered as a whole, it will be seen that the curvature of the bottom 30 in such cross sections is greater, that is to say of less radius at the center of the bottom than it is on the sides of the bottom and this is to form a moderately deep well so as to bring the upper level of the molten ferro-silicon reasonably low down in the crucible.

Referring now to Figures 3 and 5, the upper level of the molten material during continuous furnace operation will usually be at about the line 35 before pouring, and the upper level of the molten ferro-silicon will usually be at about the line 36 before pouring, naturally after pouring these level lines will be somewhat lower. When pouring the ferro-silicon, as hereinafter described, it is good practice to pour off as much as possible without pouring off any alumina. When pouring off the alumina, as hereinatfer described, it is good practice to pour off as much as can be poured without letting the level line 35 come any closer to the tapping spout 27 than about five inches.

Still referring to the same figures, the ledge 24 is L-shaped in cross section to protect the pipe 23 as shown from any molten material that may spurt out of the furnace because the continuous functioning of the pipe 23 to supply water is most important as otherwise the molten material may melt the shell 21 and flow out of the furnace with great danger to all persons in the vicinity. Molten alumina has a temperature above 2000° C. The L-shaped ledge 24 also imparts additional strength and rigidity to the upper section of the shell better to resist distortion.

Referring to Figures 1 and 6, surrounding the ledge 24 and extending upwardly therefrom for the purpose of keeping ore dust from escaping, is a hood 40 which in plan view may have a circumference of about the same shape as that of the ledge 24 and which in shape is a cylinder cut by a chordal plane having a horizontal flat top portion 41 as a cover in which however there are round openings 42 for the passage of electrodes 43 and smaller round openings 44 for the passage of feed pipes 45 which will be described. This hood 40 and its top or cover 41 may be made of sheet steel of about a quarter inch in thickness, all portions being welded together to form a unitary piece.

The hood 40 is not connected to the shell 21 of the crucible but rather is supported from the floor 47 as by means of four I-beams 48 of steel which are preferably welded to the outside of the hood 40. The clearance between the hood 40 and the ledge 24 is enough to permit tilting of the crucible in and under the hood 40 in a manner to be described. In the openings 42 in the top 41 of the hood 40 are bushings 49 made of steel and lined with a hard asbestos composition in order to prevent short circuiting of the electrodes.

Referring now especially to Figures 1 and 6, the electrodes 43 are preferably made of graphite and preferably are three in number; three feed pipes 45 are located adjacent the electrodes 43 and preferably outside of the triangle formed by the electrodes. With regard to the supporting and controlling of the vertical position of the electrodes 43 and the conductors and clamps to connect them in a three phase electrical power circuit, the art is already well informed and reference is especially invited to U. S. Letters Patent No. 2,426,643, granted upon application of my late colleague, Raymond R. Ridgway, and dated September 2, 1947. Certain considerations about the power will be hereinafter pointed out but at this point it should suffice to note that the automatic controlling mechanism is adjusted to raise and lower each electrode 43 individually, to maintain the desired current in amperes flowing in each electrode, the controlling apparatus being arranged to lower an individual electrode when the current flow therein becomes less than the previously determined value and to raise it when the current flow becomes more than the predetermined value and of course this automatic mechanism is provided with controls which are known to the art to prevent what is known as hunting. Thus the power input through the three electrodes is substantially constant for a given setting of the control apparatus, and furthermore the arcs from each electrode are maintained at about the same power input but the total power input can be changed at any time by manual controls and furthermore the bottoms of all three electrodes 43 can at will be raised to the flat top 41 to permit the extreme tilting to pour off the ferro-silicon as hereinatfer described. Naturally also power can be completely cut from all the electrodes whenever desired. In this invention the use of non-tilting electrodes is preferred. By using stationary non-tilting electrode supports it is possible to supply power to the furnace during pouring thereby enhancing efficiency of the over-all furnace operation. These controls, features and mechanisms are already known to the art and as aforesaid especial reference may be made to the above mentioned patent to Ridgway.

The positions for the three electrodes are chosen with reference to the bulge 31 so that only one electrode is over this bulge. It is desirable to have the pool of ferro-silicon mainly under one electrode only rather than under two or three because the specific resistance of the ferro-silicon is considerably less than that of molten alumina. If the pool of ferro-silicon metal were located under two or three electrodes instead of one, a considerable amount of power would flow through the pool of metal in preference to flowing entirely through the molten alumina. It is preferable that most or all of the power be liberated in the arcs and in the alumina melt. The position of the electrodes is also such that the center of the electrode triangle is the center of the part of uniform radius of the upper portion 22.

The three feed pipes 45 deliver from time to time crushed bauxite of known chemical composition to the top of the melt. So far as is possible the composition of successive batches of bauxite should be substantially uniform. This of course may be done by crushing a large shipment and thoroughly mixing it making such additions as are required to give the desired chemical composition. Any kind of mechanical feeding mechanism may be employed but it is not believed necessary to illustrate or describe such herein.

In the construction shown it is never necessary to move the two forward feed pipes 45 when tilting the crucible even to its extreme position to pour off ferro-silicon, since there is no mechanical interference. But the rear feed pipe 45 has to be raised when tilting to this extreme position to prevent interference. Accordingly I may make it (and preferably all three of the pipes 45) out of flexible steel piping and before tilting to pour ferro-silicon, a workman climbs to the top 41 of the hood 40 and lifts upwardly the rear pipe 45, which readily bends, until it is entirely out of the hood 40. This is not difficult and usually ferro-silicon is poured only every other day. This rear pipe 45 may be as easily reinserted when the pouring of ferro-silicon is finished.

Referring still to Figures 1 and 6, the top 41 has further openings, one under a rectangular header 50 at one side of the rear of the top 41 and the other under an elongated rectangular header 51 extending across the front of the top 41. The header 50 is connected to a large pipe 52 and the header 51 is connected to a large pipe 53 which, as shown, is also connected to the pipe 52. The pipe 52 is connected to a suitable suction device, not shown, the discharge end of which may return the dust collected to the bauxite bins or to a pipe connected to the feed distributor which in turn is connected to the feed pipes 45, all as indicated in the Ridgway Patent No. 2,426,643. In this manner very little material is lost and furthermore working conditions are improved. As explained in the Ridgway patent this suction apparatus serves also to draw air into the hood 40 thus preventing egress of dust into the furnace room and also cooling the hood 40 to keep it from overheating.

In a periodic electric arc furnace for fusing alumina where the entire contents of the furnace is solidified in situ after the bauxite ore has been fused, known as a Higgins furnace because it was invented by Aldus C. Higgins as disclosed by his U. S. Letters Patent No. 775,654, patented November 22, 1904, the base of the furnace has a lining of carbon. The lining of the Ridgway furnace on the bottom is formed in situ as described in the above mentioned Ridgway patent but, as also described in the Ridgway patent, that furnace was designed for fusing powdered Bayer alumina which is already at least 98% alumina $Al_2O_3$ containing some soda $Na_2O$ but not enough silica and iron oxide to form a ferro-silicon pool at the bottom of the furnace. I have made the discovery that the furnace bottom 30 can be successfully protected from attack by the molten ferro-silicon by the construction of a lining 55 of refractory alumina brick carefully fitted to the inside of the bottom 30 and I prefer also to carry the lining up to protect part of the upper portion 22 of the steel shell 21 all as clearly shown in Figure 5. The best way now known to me to make this lining is as follows.

The material is known as alumina cement and consists of coarse and fine particles of very pure, dense, fused crystalline alumina, free from porosity. A mixture of coarse and fine particles of many different grit sizes of this alumina is made and 1% of bentonite is added. Bentonite is a known material being a colloidal clay. Before ramming enough water should be added to make the mixture rammable as is known. This material was rammed in place to form the lining and then was removed and fired and replaced. It was rammed in sections to make individual bricks so that the "green" bricks could be removed.

This may be done by building partitions starting with a ring of iron near the center of the bottom 30 and continuing with wooden partitions using braces as required, then ramming one space set off by the partitions, removing a partition wall, replacing this wall with paper, ramming the adjacent space, removing another partition, replacing again with paper, and continuing to ram spaces, remove partitions and replace with paper until the entire area as shown is covered with rammed material but this material is separated into a great number of bricks by pieces of paper. Then the individual bricks are removed and fired at cone 35 which produces an extremely dense refractory brick having a high order of thermal conductivity. Firing at cone 35 means that number 35 cone will come down in such a firing operation. Firing of ceramic ware is a function of both time and temperature and not merely of temperature. The American Society for Testing Materials gives 1785° C. as the temperature at which cone 35 is brought down when the kiln is heated at the rate of 100° C. per hour. Then the bricks are carefully replaced in the position which they originally occupied. The very narrow spaces which were occupied by the paper are preferably now filled with a slurry of alumina fines, using the same white dense alumina. The lining is now in such condition that the furnace can be fired. The bricks of the lining 55 are preferably made from at least 97% particles of alumina, that is to say the bentonite or other added material should not exceed 3% according to the preferred embodiment of my invention. The alumina particles themselves are preferably at least 98% pure alumina.

In order that the arc furnace 20 may be tilted from the position in which it is shown in the drawings, it is provided with a pair of rockers 60. Each rocker 60 may consist of an outside plate 61, an inside plate 62 each shaped to conform to the furnace bottom 30 and being welded thereto and a curved shoe 63 welded to the plates 61 and 62. Teeth 64 are welded to the bottom of the plate 63. Thus in effect the plate 63 and the teeth 64 form a segment of a gear.

Referring now to Figures 1 and 7, the rockers 60 rest upon rocker supports 66, preferably made out of steel, each having a pair of arcuate upper surfaces 67 supporting the shoes 63, and each having suitable ribs 68 extending to a bottom plate 69 which is secured as by means of bolts 70 to a massive concrete base 71 resting on the floor of the furnace room. Between the arcuate upper surfaces 67 indentations or wells 75 are formed leaving between them what in effect are teeth 76. The teeth 64 of the rockers 60 fit in the indentations 75 and thus the rockers 60 are geared to the rocker supports 66 so that the locus of the shell 21 does not change relative to its support although it can be rocked to different tilted positions and then returned to the original normal position shown in Figure 1.

The curvature of the shoes 63 and the curvature of the rocker supports 66 are chosen so that the shell 21 in operation always tends to return to its upright position shown in Figure 1 and this result is readily achieved because of the flattening of the upper portion 22 on the front thus throwing the center of gravity behind the axis of the conical part of the upper portion 22.

Referring now to Figures 1, 2 and 5, to the bottom 30 at the rear of the bulge 31 is welded a flange 78 having a hole 79 to which is connected by a pin 80 a piston rod 81 having a piston 82 in a cylinder 83 having trunnions 84 journalled in plates 85 welded to channel irons 86 embedded in concrete 87 shaped to form a pit 88 in which the cylinder 83 is located and can swing. The cylinder 83 is connected by a flexible steel hose 90 which is coupled to piping 91 to a valve casing 92 in which a valve 93 and the valve casing 92 is connected by a pipe 94 to a relief valve 95 which is connected by a pipe 96 to a pump 97 which is connected by a pipe 98 to a supply tank 99. The relief valve 95 has a return pipe 100 and the valve casing 92 is connected to a return pipe 101 which extends into the tank 99. Referring to Figure 8, the tank 99, the pump 97, the valves 93 and 95 are preferably conveniently located in a control tower 105 and the piping 91 extends from the control tower 105 to the pit 88. By means of a handle, not shown, the operator can turn the valve 93 and when it is in the position shown the pump 97 is merely pumping fluid through the relief valve 95 and through the return pipe 100 back into the tank 99. But when the valve member 93 is turned to the left about 45° fluid will flow through the piping 91 and steel hose 90 into the cylinder 83 moving the piston 82 and the piston rod 81 and tilting the steel shell or bucket 21 to the right as far as the operator desires, for the tilting is under control of the operator and can be stopped at any time by a slight movement of the valve 93. In order to return the steel shell or bucket 21 to its original position, the operator turns the valve 93 to the right about 45° from the position shown which connects the piping 91 to the pipe 101 and allows the fluid to flow out of the cylinder 83. A convenient fluid to use is the fluid mostly used for hydraulic mechanisms, namely oil.

Referring now to Figure 5, the tapping spout 27 is preferably made of steel and may be welded to the flat part of the upper portion 22 of the shell 21. In shape it is an annulus having a cylindrical outer surface and a conical inner surface and with a base plane inclined to its axis where it is attached to the portion 22. This gives the tapping spout 27 a downward inclination. It has a conical lining 108 of carbon or graphite having a lip 109 at the front end and the conical lining 108 extends right through the furnace lining 55. The conical lining 108 of the tapping spout 27 is normally plugged with a graphite plug 110 which is conical and has a head 111 to keep it from wedging too securely in the lining 108. To the head 111 of the graphite plug 110 is attached a U-shaped bracket 112 which may be made of steel and extending through this U-shaped bracket 112 and through a steel lever 113 is a pin 114 thus pivotally connecting the graphite plug 110 to the lever 113. However, the plug 110 can tilt on the lever 113 only within a limited extent owing to the closeness of the lever 113 to the head 111. The lever 113 is pivotally mounted on a pin 115 extending between the legs of a long U-shaped bracket 116 welded to the front of the ledge 24. On the top of the lever 113 is a big iron ball 117. It will readily be seen that the weight of the ball 117 normally exerts a gentle force to keep the plug 110 in the lining 108 of the tapping spout 27 and this gentle force is adequate for the intended purpose. When, however, the operator with a long rod of iron hits the ball 117 to throw it to the left, Figure 5, the plug 110 is pulled out of the lining 108 and since there is nothing to hold the ball until it hits the long U-shaped bracket 116, the plug 110 is pulled away out and lifted well up above the tapping spout 27 so that it in no way interferes therewith Referring now to Figures 3 and 5, in order to keep the tapping spout 27 from melting, I provide an annular pipe 120 extending right around the spout 27 and this is connected to a pipe 121 which is connected to a T-union 122 which is connected to a rubber hose 123 connected to the water supply. This annular pipe 120 has small holes on the inside directing water all over the periphery of the tapping spout 27. This water also drips down to cover part of the bottom 30 as also does some from the pipe 23. This is another reason for giving the entire shell 21 a smooth surface for I have found that water will follow the surface of the steel practically to the lowest part of the bulge 31 by reason of surface tension if ledges or very rough places are avoided. In this connection it is important to keep the molten ferro-silicon above the lining 55 and to do this it is important to extract the heat from the lining 55 as fast as possible and to do this the bottom 30 including the bulge 31 should be continuously supplied with water. It may be pointed out that the molten ferro-silicon is far more dangerous to the steel shell 21 than is the molten alumina, for the molten alumina is practically at the freezing point and a slight chilling thereof causes it to freeze whereas the molten ferro-silicon, having a much lower freezing point, is in a condition of super heat and a slight chilling thereof will not cause it to freeze so if and when it comes in contact with the steel it will strike right through it despite the water cooling. But by extracting heat as rapidly as possible from the bottom of the lining 55 I have been successful in preventing the molten ferro-silicon from striking through.

For the same general purpose, and referring now to Figure 3, connected to the T-union 122 is a pipe 125 which extends between the plates 61 and 62 of a rocker 60. This pipe 125 likewise has holes to direct the water upwardly against the underside of the bottom 30 where water could not otherwise reach on account of the plate 61. On the other side there is a similar pipe 126 likewise directing water upwardly between the plates 61 and 62 for the same purpose and this, as shown in Figure 1, is connected to a flexible rubber hose 127 which supplies water thereto. Similarly pipes 130 and 131 on the outside of the plate 62 supply extra water to the bottom 30 and these are connected to rubber hoses supplying water such as the rubber hose 132 for supplying water to the pipe 131. It should be understood that all of these water supply pipes have holes all along their lengths to direct streams of water upon the outside of the shell 21 at the most advantageous positions to keep the entire outside of the shell 21 covered with water and this it has been found possible to do and in fact during operation of this furnace there have been no dry spots on the outside of the shell 21. Nevertheless, I believe a few dry spots of very small area could be tolerated.

It is important that the water flowing over the shell 21 shall not drip into the molds or into the pouring trough both of which will later be described. In order to keep this from happening, especially when the crucible is tilted for pouring, I provide an iron shield 135, the shape of which is best shown in Figure 3 taken in connection with Figure 4, and which should be welded to the ledge 24 and also to the tapping spout 27 all the way around the spout.

Referring now to Figure 8, I provide a track 140 extending from a wide track 141 to another wide track 142 and passing close by the furnace. I provide a number of cars such as the car 143 shown in Figure 1, each car 143 having wheels 144 to roll on the track 140 so that the cars 143 are movable thereon. I further provide wide flat cars 145 having wheels 146 on the tracks 141 and 142 and these wide flat cars 145 carry tracks 147 thereon of the same gage as the track 140.

Each car 143 can carry three iron molds 150 into which the fused alumina is poured in order that it may freeze into ingots. I provide additional tracks 151 and 152, and I might have even more, connecting the wide tracks 141 and 142. The cars 145 are transfer cars and the tracks 141 and 142 are located at a lower level than the tracks 140, 151 and 152 so that the tracks 147 on the cars 145 can be placed in position to form continuations of the tracks 151 and 152 or either of the tracks 147 can be placed in position to form a continuation of the track 140. It will be noted that each wide track 141 and 142 has a wide flat transfer car 145.

I provide an endless cable 155 extending from a pulley 156 secured on a fixed axis between the rails of the track 140 near the track 141 to a pulley 157 tensioned by a spring 158. Both strands of the endless cable 155 pass across a pit 160 wherein is located a motor and driving mechanism for moving the cable 155 in either direction. The motor and driving mechanism are not shown since apparatus for moving a cable is well known.

Referring now to Figures 1, 8 and 9, I provide a clean-out pit 161 having concrete walls as shown and in plan view having an L shape as shown in Figure 8 so that the workman can obtain access to the bottom of the pit even though there are cars 143 on the track 140 which extends right across the pit 161 being supported upon girders 162 extending from wall to wall of the pit as well shown in Figure 1. In this figure the two strands of the cable 155 can be seen and it will be noted that the lower strand of the cable passes under an angle iron 163 extending from one wall to the other of the pit 161 to protect the cable from molten alumina which may spatter from the molds 150 during pouring. Preferably also the cars 143 have angle irons 164 to protect the upper strand of the cable 155.

Extending beyond the pit 150 I further provide a pit 165 which is a pouring pit into which molten ferro-silicon is poured. This pit 165 may have concrete walls as indicated in Figures 1 and 11 and it is lined with brick 166 and is preferably further provided with a lining of loose alumina fines 167.

I further provide a car dumping pit 170 equipped with apparatus for tipping a car 143 to a position where the congealed contents of alumina will fall out of the molds 150, such apparatus holding the molds 150 in place on the car 143 during the tipping. I shall not describe this apparatus herein since it is the subject of a separate application by myself and Edward Van der Pyl, Serial No. 549,008, filed August 11, 1944, now abandoned.

For a pouring operation a train of cars 143 is made up, each car having molds 150, and the train is connected to the cable 155 and the first car is positioned in line with the tapping spout 27. As indicated herein and as further described in a copending application, Serial No. 549,009, by Edward Van der Pyl, filed August 11, 1944 now Patent 2,489,602, the cars 143 are of such size in relation to the molds 150, and the molds 150 are of such shape that not only are the several molds, usually three, on a car 143 in contiguous relation to each other but the end molds of each car touch the end molds of adjacent cars except of course at the front and rear of the train. The crucible is now tilted to draw off some alumina and the plug 110 is removed from the tapping spout 27. At the same time the cable 155 is started to move the train toward the track 141. The speed of the train of cars is adjusted so that as soon as a mold 150 is filled with molten alumina it moves beyond the pour stream which starts to fill the next mold. Finally all of the molds 150 of the train of cars are substantially filled with molten alumina and then the operator moves the crucible back to its normally vertical position as shown in Figure 1. During this pouring operation surprisingly little alumina splashes over into the pit 161, but such as does go into the pit 161 is now far removed from the track 140 and the cars 143 and so does no harm. Furthermore it can be collected with a shovel after it has solidified.

Now the cars are transferred two at a time to the transfer cars 145 and then transferred to the tracks 151 and 152. From the track 141 to the track 142 the tracks 151 and 152 preferably run slightly down hill. Preferably from the track 142 to the pit 170 the grade along the track 140 is slightly up hill then from the pit 170 to the furnace the grade is substantially on the level, then from the furnace to the track 141 the grade is up hill. These grades assist the movement and control of the cars. I preferably provide hydraulic plunger mechanism 175 to move cars 143 from the transfer cars 145 to the dumping pit 170.

Eventually the tracks 151 and 152 are substantially filled with cars 143, and those near the track 142 contain, in the molds 150 thereof, solidified alumina while those near the track 141 contain, in the molds thereof, still molten alumina. In fact, the temperature of the alumina in the molds 150 becomes less and less as one moves along the tracks 151 and 152 from the track 141 to the track 142. I use many more cars than those illustrated in Figure 8 in the operation of this furnace.

For transferring cars 143 from the track 140 to the transfer cars 145 on the track 141, the train may be uncoupled and individual cars can be pushed by manpower using long iron rods. On the other hand, the cable 155 can also be used by coupling the cable to the rear cars of the train and shunting the forward car as is done in railroad yards.

When a quantity of ferro-silicon has accumulated in the shell 21 about up to the line 36, it is time to pour off ferro-silicon. For that purpose I provide a pouring trough 180 which is illustrated in Figures 9, 10, 11 and 12. This may comprise a steel shell 181 in the shape of a partial cylinder holding bricks 182 of highly refractory material such as sintered alumina, and it will be noted that the upper surfaces of the bricks 182 form a concave trough. The shell 181 is braced with a pair of side fins 183 and a central fin 184. Comparing Figures 9, 11 and 12 it will be seen that the side fins 183 are shaped to rest upon a car 143 while the central fin 184 is shaped to straddle the car 143. Thus the pouring trough 180 can be readily placed in position on a car 143 and is quite stable on the car but may readily be removed therefrom as by means of an overhead crane. The pouring trough 180 may be deposited on the ground near the track 140 except when it is being used to pour ferro-silicon.

When it is decided to pour ferro-silicon, a train of cars is made up as previously described, and on the last car is placed the pouring trough 180 adjacent the last mold 150 of the car ahead. Then the train is moved slowly by the tapping spout 27 which is tilted to pour off alumina. When the mold 150 just ahead of the pouring trough 180 is substantially full, the operator quickly moves the pouring trough 180 in line with the tapping spout 27 and quickly, without returning the crucible to the level position or interrupting the flow of material from the spout, tilts the crucible to its extreme position as shown in Figure 9 and pours the ferro-silicon which flows into the pit 165. Just prior to moving the pouring trough 180 into position as above described the electrodes 43 are raised to the level of the top 41 and at the same time the rear feed pipe is raised as previously described, all in order that the crucible may be tilted to the extreme position.

I have found that this operation can be performed without the loss of any considerable quantity of alumina into the pit 165 which becomes filled with a high grade of ferro-silicon which finds a ready market.

Although the above described procedure for pouring the ferro-silicon is the one that I prefer, nevertheless it is quite feasible to pour ferro-silicon without pouring alumina immediately prior thereto. For example the pouring trough 180 may be placed in position, the electrodes raised, the rear pipe 45 raised, the crucible shell 21 tipped to extreme position as shown in Figure 9, then the plug 110 removed and the tapping spout 27 rammed to break the alumina crust allowing the ferro-silicon to pour off without any previous pouring of fused alumina immediately prior thereto. But in order to show the reason for my preference of the first described procedure, I shall now make some observations about fused liquid alumina and fused liquid ferro-silicon respectively.

There is not much if any super heat in the liquid alumina since its temperature is very close to the melting point if not exactly thereat. On the other hand, the ferro-silicon having a melting point much lower than the temperature attained in the furnace, has a very great amount of super heat being hundreds of degrees hotter than its melting point. Ferro-silicon flows down the trough like water but the alumina flows down the trough slower and part of it freezes. Consequently the operator does not have much difficulty in deciding which of the liquid materials is actually coming out of the tapping spout 27 when he is pouring into the trough 180.

So therefore, of course, if the operator is pouring ferro-silicon and suddenly sees alumina coming out of the spout, he can proceed to stop the tapping operation. It should be apparent, from the description of this invention taken in connection with the accompanying drawings, that the ferro-silicon is poured from below a pool of liquid alumina, this being one of the features of this invention. Ferro-silicon has no tendency to freeze in the tapping spout 27 because it has so much super heat but alumina, having considerably less super heat, does have a tendency to freeze in the tapping spout 27 and, as alumina is poured, a lining of alumina gradually forms in the conical lining 108 reducing the diameter of the bore thereof. This is desired because, when proceeding as first described, the ferro-silicon is poured with the lining 108 already having an inner lining of alumina encrustation but leaving a large enough bore for sufficiently rapid pouring of the ferro-silicon, most of which can be gotten rid of in 15 minutes or less; when the entire bath has dropped to such level that the level line 36 has reached the tapping spout during pouring of ferro-silicon and alumina starts to flow out of the spout 27, it quickly freezes in the already diminishing bore and this tends automatically to stop the pouring. This is greatly desired because thereby wastage of the valuable alumina is prevented and of course I also do not want to contaminate the ferro-silicon with alumina because the ferro-silicon is a salable material.

It should now be apparent that before any pouring operation starts, the operator has to ram out a crust of alumina just covering the inside of the opening of the tapping spout 27. This is done with a long rod of iron, 20 feet long or more so the operator can stand far away from the furnace, which may be supported by a chain from overhead while still leaving the operator free to swing the end opposite to him as desired. By imparting to such a long rod a quick motion, a very heavy blow can be given to the encrustation by the ram rod which is thrust into the conical lining 108. This will serve to break any encrustation of alumina that has formed blocking the spout 27 and as soon as the encrustation is broken, alumina or ferrosilicon, as the case may be, starts to pour.

The freezing of some alumina in or near the tapping spout 27 is not only desirable from the point of view above explained but it enables the graphite plug 110 to be changed and replaced with a new one whenever desired and it is usually desirable to do so about once every two weeks. Naturally a piece of graphite subjected to extreme temperatures that this plug is subjected to oxidizes slowly and needs replacement. These plugs are cheap enough and since there is an encrustation of alumina covering the hole, replacement can be duly made without shutting down the furnace.

It will be noted that pouring of the ferro-silicon is done with the electrodes removed and therefore supplying no energy to the contents of the shell 21 but since this takes only 5 to 15 minutes, the alumina bath does not freeze and the heat energy contained in the shell 21 is mostly saved. It will also be noted that, since the electrodes do not have to be raised while pouring molten alumina, the power can be kept on and I do keep supplying energy to the bath while pouring the molten alumina. This is a great advantage since alumina is poured frequently while ferro-silicon is poured only occasionally.

The encrustation of alumina inside of the graphite lining 108 during a pouring operation has been explained above. Consequently after each pouring operation the encrustation should be cleaned out of the lining 108. This may be readily done by tilting the furnace back beyond the level position about 10° and then, with the ram rod, breaking the encrustation inside of the graphite lining 108. The furnace can be tilted back of the level position, that is to say in the direction opposite to the direction of tilting for pouring, simply by manipulating the valve 93 to allow it to move back because of the unbalanced condition of the furnace. The furnace may also be tilted back 10 or 12° prior to changing the tapping spout as this makes the operation a little safer than merely relying on the encrustation. It will be understood that the travel of the piston 82 in the cylinder 83 is sufficient to allow movement from a backward tilt of 15° to a forward tilt as shown in Figure 9 sufficient for the pouring of the ferro-silicon. In the position shown in Figure 9 the furnace is tilted forward about 30°.

The material which is supplied to this furnace to produce crystalline alumina will ordinarily be bauxite ore. Using Arkansas bauxite ore, crystalline alumina having the advantageous characteristics described in the objects at the beginning of this specification is produced. I have also found that crystalline alumina made in this furnace makes better grinding wheels bonded with vitrified bond since they are less susceptible to deterioration from wetting than similar grinding wheels having alumina made in the Higgins furnace. This may be attributable to better distribution of impurities throughout the crystals of alumina and this is ultimately attributable to the furnace and the method of this invention because no other changes in the production of crystalline alumina were made.

As above indicated, the addition to be made to the calcined bauxite in preparing the charge for this furnace will be the additions ordinarily made to bauxite for charging into a Higgins furnace, that is to say carbon in the form of coke and iron in the form of borings or other comminuted material with individual pieces preferably having no dimension greater than one inch. The quantity of coke and iron to add may be in accordance with prior art practice or variations may be made for special purposes so therefore it does not seem encumbent upon me to give the chemical formulae involved in reduction nor to state ranges of proportions of materials since these matters are known to the art. If a purer alumina is wanted more carbon can be used in reducing the impurities as is known. For the purposes of this invention I add enough iron to form a ferro-silicon that is preferably 85% iron but at all events between 80% and 90% of iron. A man skilled in the art will readily know how much iron to add to produce this result, since an analysis of the ore will indicate how much elemental carbon the coke should have to reduce the silica and how much silicon that will yield, also how much iron will be liberated from the reduction of the iron oxide in the bauxite ore and then how much iron ought to be added to give between 80 and 90% iron in the ferro-silicon, the proportions of course being by weight. The formula then is iron addition equals weight of silicon formed by reduction divided by 15 times 85 minus the weight of the iron produced by reducing the iron oxide in the bauxite. This formula can be varied by substituting any number between 80 and 90 in place of the 85.

In order to start my furnace in operation only a small quality, for example 20% to 30% of the weight of the charge when the furnace is full, of bauxite ore plus additions is usually placed in the bottom of the furnace, then conductive paths for the electric arc are made by depositing graphite or coke on the mixture to form a path from each of the three electrodes to the others, then the electrodes are lowered and the power is applied and the mixture is fed through the three pipes 45 as continuously as possible and at a rate no greater than that at which the power supplied can melt the mixture. Actually the furnace of this invention as already operated was of a size to hold, when full, about 20 tons of mixture and such a furnace requires approximately 1500 kilowatts of power. In the course of time the shell 21 will become filled with fused material to the line 35 as shown in Figure 5 and then alumina can be poured. It has already been explained that the level line 35 should not come any closer to the tapping spout 27 than about 5 inches during pouring. Because this furnace is continuously fusing bauxite mixture, the oxides such as silica and titania have not been reduced to any great extent at the line 35 or close thereto. In other words the well reduced and the good molten alumina is well below the line 35, that is close to the pool of ferro-silicon. This is the reason for tilting the furnace to pour off the alumina.

Because of the excellent characteristics of the lining 55, I do not have to load the shell 21 with a large load of bauxite mixture prior to applying power as is done in operating the Higgins furnace but may as above described start the furnace in operation after placing in the shell 21 only 20% to 30% of the bauxite mixture or even less if desired. It was necessary to load the Higgins furnaces with a large quantity of bauxite before applying power so that fusion would reach top and bottom substantially coincidentally because whenever molten ferro-silicon reached the carbon bottom of these furnaces and stayed in contact with it for any substantial length of time, formation of gas became rather violent so it was customary and still is customary to precharge a Higgins furnace with enough mixture before applying power so that the fusion reached top and bottom about coincidentally and then the power was shut off. But my lining 55 of bricks of rammed and sintered alumina is very dense and can hold a pool of ferro-silicon if necessary which does not react with the alumina bricks and furthermore the ferro-silicon does not strike through. These bricks are far denser than the lining formed in situ as described in the Ridgway patent above mentioned. Because of the high super heat of the ferro-silicon and because of its reactivity with carbon, the character of the lining 55 is a matter of considerable importance. I have had success making a lining as described and although at one stage it consists of individual bricks yet by reason of the slurry of fines and the heat to which it is subjected the lining 55 becomes practically monolithic. It therefore may be termed a monolithic lining of dense self-bonded crystalline alumina having a uniform density from the inside of the lining to the outside of the lining. This monolithic lining may be formed in other ways and I may use other refractory material such as spinel.

Encrustation of alumina about the tapping spout 27 on the lining 55 has already been mentioned. This encrustation of alumina actually covers the entire lining 55 and is formed during the initial stages of the first fusion and is maintained by the continuous fusion of ore in the furnace. This encrustation is usually as thick as the lining 55 and sometimes thicker reaching even a thickness of one foot at the bottom of the furnace and serves in combination with the lining 55 to protect the shell 21. Thus molten ferro-silicon is usually not in contact with the lining 55. In order to obtain a good encrustation covering the lining 55 I may and preferably do start the fusion with already purified alumina fines and after the fusion has reached the line 36, I start adding bauxite ore with coke and iron as described. A typical encrustation so produced is represented by the dotted line 190, which represents the inner boundary thereof, and it will be seen that it is thicker at the bottom of the crucible 21. This furnace is intended to be operated continuously and I have operated a furnace constructed in accordance with this invention for a period of many months without shutdown.

It will be noted that, by reason of the shape of the crucible 21 and the shape of the encrustation 190 which naturally forms, most if not all of the ferro-silicon is poured off at a ferro-silicon tapping stage. Thus at this time fused alumina is in contact with the bottom of the encrustation 190 as the alumina pool gradually lowers and at this time the power is off. So during pouring of the ferro-silicon the encrustation 190 rebuilds itself on the bottom of the crucible. It is the combination of the lining 55 and the encrustation 190 which makes the furnace safe and successful. The encrustation 190 may be termed a natural crucible of alumina.

By fusing bauxite ore or other aluminous ore in the furnace described herein and following the method described herein and adding to the ore enough carbon to reduce the impurities such as silica, iron oxide, titania and magnesia and enough iron to form ferro-silicon with at least 80% iron, ingots of alumina can be produced consisting of 94% Al₂O₃ or better with a good crystalline structure having the features set forth in the objects at the beginning of this specification. Likewise, in accordance with the objects, a salable ferro-silicon is produced as a by-product.

The iron molds 150 are massive molds in the nature of ladles. I have found that I can pour liquid alumina which has a temperature over 2000° C. into these molds 150 without melting the iron although iron has a melting point of about 1535° C. This is probably because the heat is conducted away so rapidly from the molten alumina by these massive iron molds. Each of these molds 150 has a capacity of about 300 pounds of alumina and has a wall thickness on the order of 2½ inches, an inside depth on the order of 17 inches, and in horizontal inside dimensions the molds 150 may be of the same length and breadth, on the order of about 18 inches. The molds are rounded at the bottom and have flaring side walls.

The method of casting ingots of alumina from a fusion of ore disclosed herein is claimed in a divisional application Serial No. 216,513, filed March 20, 1951.

It will thus be seen that there has been provided by this invention an apparatus in which the various objects of the invention and many practical advantages are successfully achieved. As many possible embodiments may be made of the invention and as many changes might be made in the embodiments above set forth, it is to be understood that all matter set forth herein is to be taken as illustrative and not in a limiting sense.

I claim:

1. In an electric arc furnace, a crucible in the shape of a frusto-cone small end up with a flat wall interrupting its otherwise conical surface at the front and a curved bottom at the large end of the cone having a depending bulge to the rear of the geometrical axis of the cone, the bottom being continuous with the frusto-cone and the crucible being hollow and made of metal, a single spout in the crucible said spout being located in the flat wall above the bottom and below the top of the crucible, a plurality of electrodes extending downwardly into the crucible, a mounting for the crucible, means for tilting the crucible on the mounting to lower the spout for pouring, a refractory lining for the bottom of the crucible and extending part way up the inside of the frusto-cone the spout being located below the top of the lining, and means for cooling the outside of the crucible.

2. In an electric arc furnace as claimed in claim 1, the combination with the parts and features therein specified, of water pipes arranged around the outside of the crucible to cover all of the outside of the crucible with water.

3. In an electric arc furnace as claimed in claim 2, the combination with the parts and features therein specified, of a continuous unbroken lining for the bottom of the crucible, said lining being made of individual bricks of dense self-bonded crystalline alumina.

4. In an electric arc furnace as claimed in claim 1, the combination with the parts and features therein specified, of a continuous unbroken lining for the bottom of the crucible, said lining being made of individual bricks of dense self-bonded crystalline alumina.

5. In an electric arc furnace for fusing alumina ores, a crucible in the shape of an asymetric bucket of metal with a deep spot spaced from the axis and a bottom inclining upwardly from the deep spot, a plurality of electrodes extending downwardly into the crucible, a lining of alumina bricks on the inside of the crucible over the bottom and extending up the sides of the crucible all the way around the crucible, an encrustation of alumina formed from the furnace charge upon the bricks being thick over the bottom bricks and of lesser thickness above the bottom, a single spout in the crucible with an orifice extending through the lining and the metal of the bucket and being located above the furnace bottom and well below the furnace top and on the side opposite the deep spot, the bricks being dense and made of at least 97% alumina particles sintered together, a mounting for the crucible, and means for tilting the crucible on the mounting to lower the spout.

6. In an electric arc furnace for reducing and purifying bauxite and the like with the production of ferro-silicon as a by-product, a metal crucible in the shape of a frusto-cone small end up with a flat wall interrupting its otherwise conical surface at the front and a curved bottom continuous with the frusto-cone at the large end thereof, a tapping spout in the flat wall well below the top of the crucible and above but adjacent to the bottom of the crucible, a plurality of electrodes extending downwardly into the crucible, a mounting for the crucible, means for tilting the crucible on the mounting to lower the tapping spout for pouring, means to cover the outside of the crucible including the frusto-cone, the flat wall and the bottom with water continuously flowing, a lining of defense individual bricks of at least 97% alumina at least 98% pure, said alumina being sintered under substantially cone 35 conditions of firing said lining of bricks covering the entire bottom of the crucible and the inside of the frusto-cone and flat wall to above the level of the tapping spout, and an incrustation of alumina formed in situ covering the lining of dense individual bricks to above the level of the tapping spout.

JOHN A. UPPER.

REFERENCES CITED

The following references are of record in the file of this patent:

UNITED STATES PATENTS

| Number | Name | Date |
| --- | --- | --- |
| 707,776 | Heroult | Aug. 26, 1902 |
| 862,008 | Nebel | July 30, 1907 |
| 1,099,131 | Serpek | June 2, 1914 |
| 1,161,620 | Coulter | Nov. 23, 1915 |
| 1,304,350 | Moore | May 20, 1919 |
| 1,411,158 | Bradley et al. | Mar. 28, 1922 |
| 1,442,925 | De Luca | Jan. 23, 1923 |
| 1,853,097 | Tatsumi et al. | Apr. 12, 1932 |
| 1,924,201 | Schuffler | Aug. 29, 1933 |
| 2,122,032 | Goldberg et al | June 28, 1938 |
| 2,402,190 | Van der Pyl et al. | June 18, 1946 |
| 2,426,643 | Ridgway | Sept. 2, 1947 |
| 2,426,644 | Van der Pyl | Sept. 2, 1947 |
| 2,481,433 | McBroom | Sept. 6, 1949 |